(12) United States Patent
Nohynek

(10) Patent No.: US 6,758,161 B2
(45) Date of Patent: Jul. 6, 2004

(54) DEVICE FOR THE COATING OF GRANULATES AND SEEDS

(75) Inventor: Oliver Nohynek, St. Gallen (CH)

(73) Assignee: Driam Anlagenbau GmbH, Eriskirch (DE)

( * ) Notice: Subject to any disclaimer, the term of this patent is extended or adjusted under 35 U.S.C. 154(b) by 0 days.

(21) Appl. No.: 10/276,892
(22) PCT Filed: May 9, 2001
(86) PCT No.: PCT/EP01/05238
§ 371 (c)(1),
(2), (4) Date: Nov. 19, 2002
(87) PCT Pub. No.: WO01/89446
PCT Pub. Date: Nov. 29, 2001

(65) Prior Publication Data
US 2003/0145786 A1 Aug. 7, 2003

(30) Foreign Application Priority Data
May 19, 2000 (DE) .......................... 100 24 407

(51) Int. Cl.⁷ ............................................... A23G 3/26
(52) U.S. Cl. .......................... 118/19; 118/303; 118/418
(58) Field of Search .......................... 118/19, 303, 418; 427/2.14, 242; 426/289

(56) References Cited
U.S. PATENT DOCUMENTS

| 4,499,847 A | 2/1985 | Dunazitschik | 118/19 |
| 4,639,383 A | 1/1987 | Casey | 427/213 |
| 5,038,709 A | 8/1991 | Yamada et al. | 118/666 |
| 5,238,494 A | 8/1993 | Dunajtschik | 118/19 |

FOREIGN PATENT DOCUMENTS

| DE | 40 36 697 | 11/1990 |
| DE | 37 05 343 | 4/1995 |
| DE | 40 36 668 | 9/1997 |
| DE | 298 02 720 | 8/1999 |
| EP | 0 355 771 | 2/1990 |
| EP | 0 376 009 | 7/1990 |
| EP | 0 382 160 | 8/1990 |
| EP | 0 717 932 | 6/1996 |

Primary Examiner—Laura Edwards
(74) Attorney, Agent, or Firm—Baker & Daniels

(57) ABSTRACT

A device for the coating of granulates and seeds, pellets and dragées with one or several coatings, whereby the seeds for coating are placed in a driven rotating drum, into which baffles fixed to the housing, in particular, spray and cleaning arms extend. Air supplies are connected to the drum by means of which the interior of the drum is subjected to an air stream. The air distribution in the drum is achieved by means of an air distribution plate fixed to the front side of the drum arranged opposite a non-rotating air distribution plate fixed to the housing, which is formed such that it may move in an axial direction towards and away from the drum and which may be connected to the drum by means of air. An improved cleaning of the housing and drum air feed is thus guaranteed.

19 Claims, 5 Drawing Sheets

DEVICE FOR THE COATING OF GRANULATES AND SEEDS

BACKGROUND OF THE INVENTION

The invention relates to a device for coating granulates and seeds.

Such a device is known from DE 40 36 697 C2 whose disclosure content is hereby fully incorporated in the present invention specification.

Such devices, which are also commonly known as "dragée making machines", are used for coating granulates and seeds, especially in the pharmaceutical industry, but also in the food industry and especially in the candy industry.

These are relatively large rotating driven drums in which the seeds to be coated are placed. One or more nozzle lips engage in the drum via which, during operation, a coating is distributed over the seeds or granulates rotating in the drum.

A sophisticated air system is required which is responsible for preventing that the seeds, which are usually coated with a sticky coating, will stick together.

Such machines must be thoroughly cleaned after the coating process is completed. Cleaning is difficult as the drum is not easily accessible because it is connected to respective air supplies and covered by a housing.

It is known in the art to clean the drum through respective access openings where spray nozzles are placed in said access openings so as to distribute the cleaning agent in the drum.

However, the known cleaning process is disadvantageous in that the air inlet and air outlet ducts in the drum can be cleaned only with considerable effort or not at all.

Therefore, it is the aim of the invention to configure a device as described above such that it can be cleaned better overall. Especially the air inlet and outlet ducts should be cleaned quickly and highly efficiently.

SUMMARY OF THE INVENTION

A substantial feature of the invention is that the air is distributed in the drum by means of an air distribution plate fixed to the front side of the drum disposed opposite a non-rotating air distribution plate fixed to the housing, which is formed such that it can move in axial direction towards and away from the drum and which can be connected to the drum by means of air.

The technical solution offers the considerable advantage that the entire air distribution and removal system is configured such that it can move towards and away from the drum because a non-rotating air distribution plate is provided on the front side of the drum, which can move in axial direction towards and away from the drum.

This is advantageous in that the air distribution plate fixed to the housing can be lifted off of the front side of the drum for cleaning purposes, which, for one, exposes the air ducts leading into the front side of the drum where they can be cleaned very easily and also, the part of the air supply to the drum on the housing is easily accessible and can be quickly inspected and cleaned.

Therefore, such a movable air distribution plate fixed to the housing is also advantageous in that all air supplies close to the drum and on the drum can be visually inspected so as to determine whether any foreign objects or residues from other products remain in the air system. The drum will then not be reloaded for reasons of hygiene. Therefore, inspections and cleaning of the air inlet and outlet ducts, both on the housing and the drum, are considerably improved.

The displacement drive for shifting the air distribution plate fixed to the housing in axial direction can be realized by various different embodiments. According to a preferred embodiment, the displacement drive is achieved by means of several thrust cylinders evenly distributed over the circumference. One side of the thrust cylinder is supported by a buffer fixed to the housing while the other side, for example the piston rod, joins the air distribution plate fixed to the housing.

According to a preferred embodiment, three such thrust cylinders are evenly distributed over the circumference.

Of course, in other embodiments, other axial displacement drives can be used for the air distribution plate, such as an electromagnet, a spindle drive, a linear motor or a hydraulic cylinder.

According to another feature of the invention, which is to be protected separately from the above mentioned axial, movable driven air distribution plate, the air ducts in the drum are also especially easy to clean.

According to said additional feature, each of the ducts in the drum is covered in radial outward direction by means of an air duct cover substantially extending approximately over the total axial length of the drum and which is also configured such that it can move in a radial direction towards and away from the drum.

The above results in the considerable advantage that by lifting off the air duct covers and possibly swinging them out, the air ducts in the drum can also be made easily accessible.

There are various embodiments for moving the air duct covers, all of which are encompassed by the present inventive idea.

According to a first embodiment of the invention, the air duct covers are configured such that with their respective left and right side mountings on the drum, they can be removed and moved towards the surface area of the drum approximately parallel to said surface area. To this aim, the two opposite mountings are provided with suitable articulated levers. Therefore, by means of operating said articulated levers manually or device-controlled, each air duct cover can be lifted off of the drum in radial direction so as to produce a cleaning gap extending in axial direction of the drum between the drum surface and the removed air duct cover.

Cleaning is achieved in that when the air duct covers are lifted off, the drum with its bottom part dips into a vat filled with cleaning solution disposed underneath the drum. The cleaning solution enters through the above mentioned cleaning gap between the surface area of the drum and the lifted off air duct covers and thus cleans all air ducts in the drum.

According to another, further feature of the invention, the air duct cover can be lifted off not only parallel and in vertical direction with respect to the surface area of the drum, it can additionally (or alone and solely) be configured such that it can swing towards and away from the drum.

Therefore, this means that the respective air duct cover is mounted on the drum so as to swing on one side and it can swing away or towards the drum.

Both possible movements, which means lifting the air duct cover parallel off of the drum and the swinging movement of an air duct cover mounted on one side of the drum so as to swing, are protected separately by the present invention as essential features of the invention.

The air duct cover swinging away fully is advantageous in that the air duct cover is thus swung away completely from the drum and the interior can be visually inspected. It can also be fully removed, i.e. it is mounted on a hinged bearing disposed on one side and can easily be removed.

According to a preferred embodiment, nine air supply openings are evenly distributed over the circumference of the drum, each of which leading into an associated air duct. Consequently, each air duct can be sealed by means of an air duct cover, which, according to the above description, is configured so as to either move in radial direction or swinging on one or both sides with respect to the drum.

Both moving mechanisms, namely the radial movement and the swinging movement, can be combined in one single device.

This is preferably achieved by providing a dual lever mechanism which ensures that the two sides of the air duct cover are evenly lifted off of the drum when a dual lever provided on one side is actuated.

The subject matter of the present invention not only comprises the subject matter of each individual patent claim, it also comprises the combination of the individual patent claims.

All information and features disclosed in the documents, including the abstract, especially the spatial configuration illustrated in the drawings, are claimed as essential to the invention to the extent that they are new compared to the prior art, either individually or combined.

BRIEF DESCRIPTION OF THE DRAWINGS

The invention will be described below in more detail by means of the drawings which illustrate only one potential embodiment. Additional features that are essential to the invention and advantages of the invention are included in the drawings and the description.

The drawings show the following.

DETAILED DESCRIPTION

Figure 1:
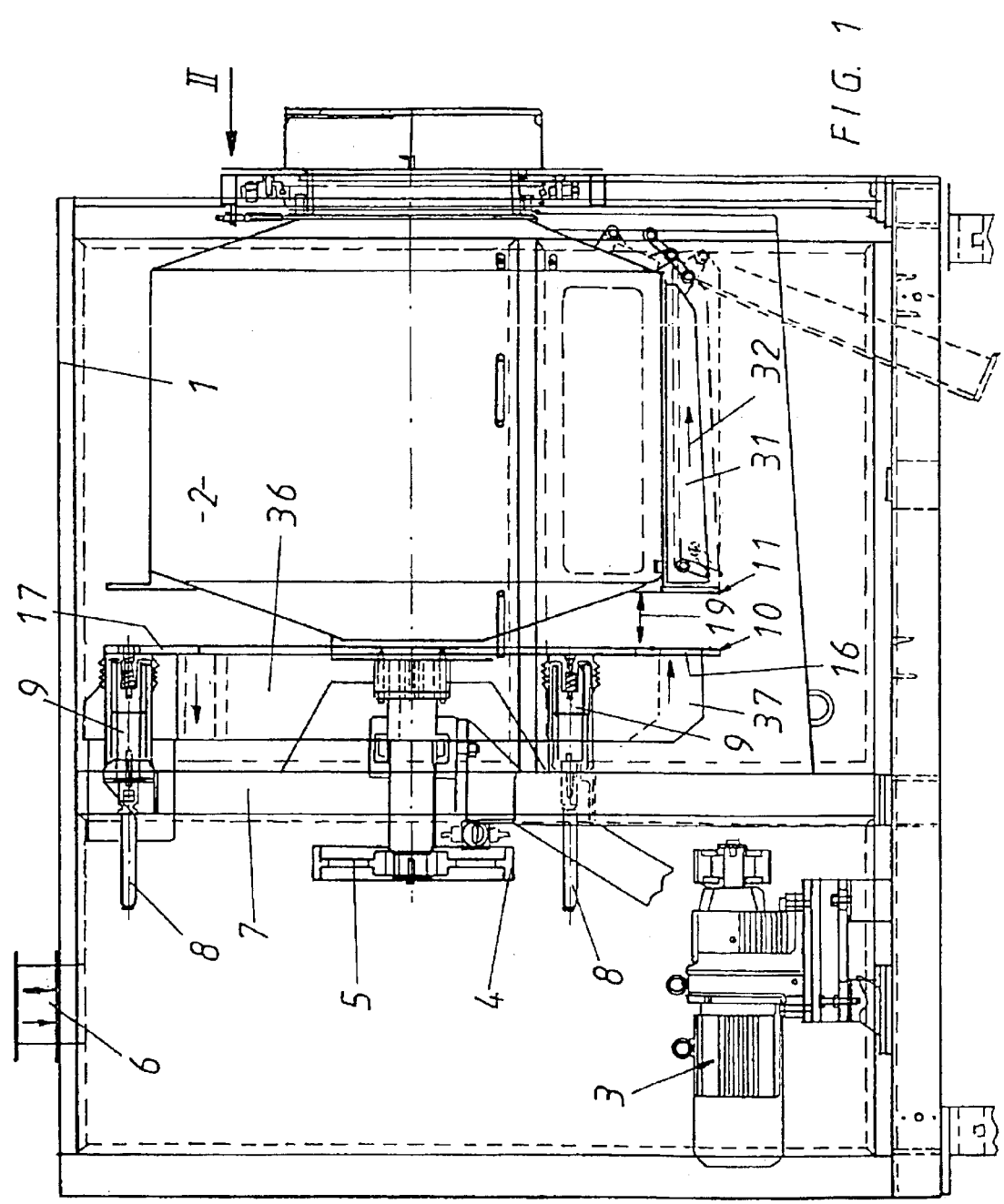
FIG. 1 is a schematic section of a device of the invention.
Figure 2:
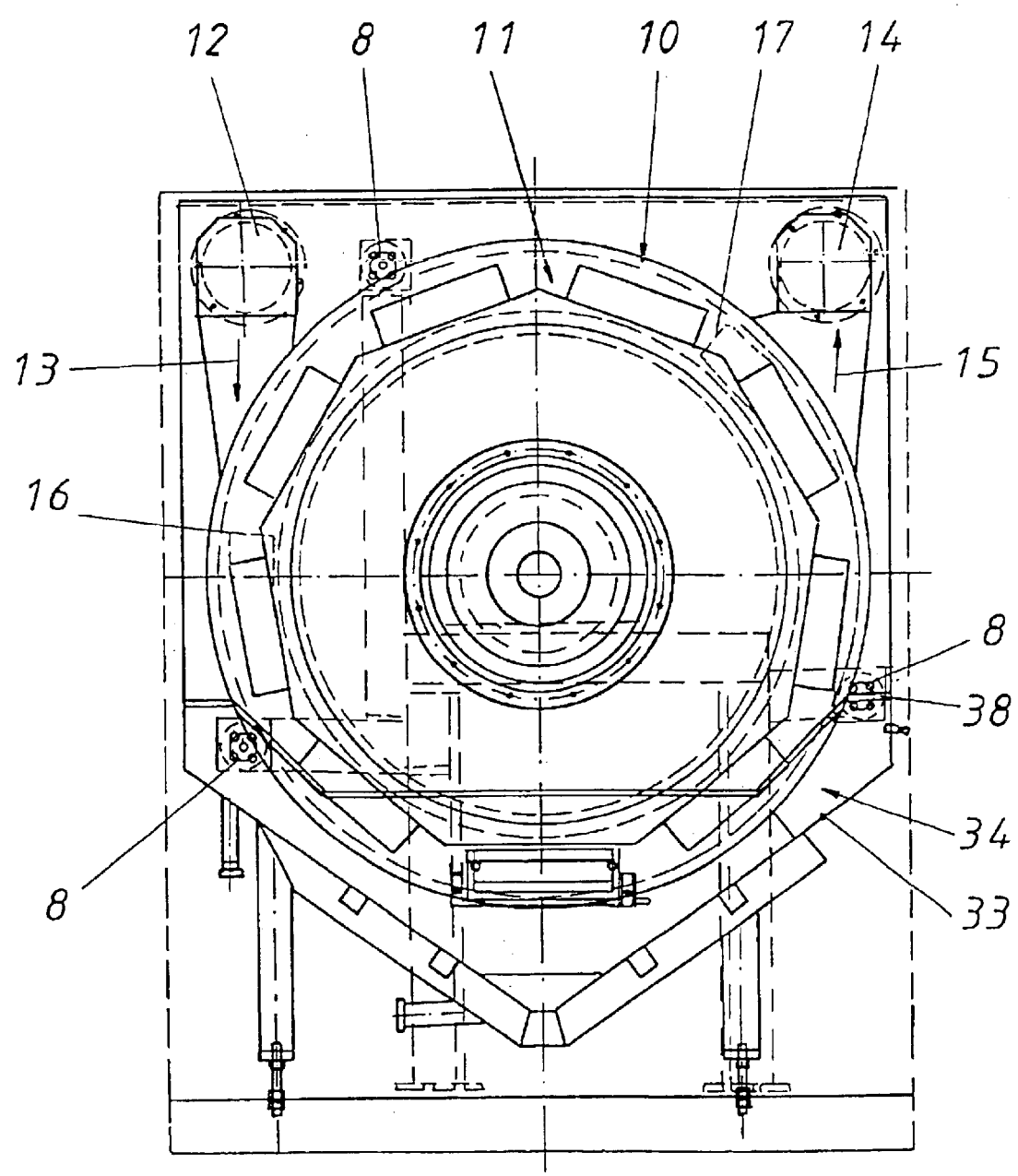
FIG. 2 is a diagram of a front view in the direction of the arrow [in] FIG. 1.

Generally, in FIGS. 1 and 2, a driven rotating drum 2 is provided in a housing 1.

The rotating drive is achieved by means of a driving motor 3 operating the drive pulley 5 via a belt 4. The drive pulley 5 is connected to a respective motor shaft so as to be rotation-proof, and the shaft is firmly connected to one front side of the drum 2.

On the opposite side, the drum 2 is mounted in pivot bearings which are not shown in detail.

The air is supplied to the housing 1 via several air pipes 6 only one of which is shown diagrammatically in FIG. 1. It is suggested that some of the air pipes 6, which are not shown in detail, are provided for the air inlet and other air pipes 6 are provided for the air outlet.

The air is supplied and removed via elastic tubes to the associated air inlet and air outlet openings 16, 17 in an air distribution plate 10 fixed to the housing.

The air distribution plate 10 is driven so as to be moved on a solid wall 7 in axial direction with respect to the drum 2. Three thrust cylinders 8 are provided as the displacement drive. One side is mounted to the wall 7 fixed to the housing and the other side is mounted to the air distribution plate 10.

Linear sliding bearings 9 are provided for guiding the air distribution plate 10 in the housing 1.

Figure 3:
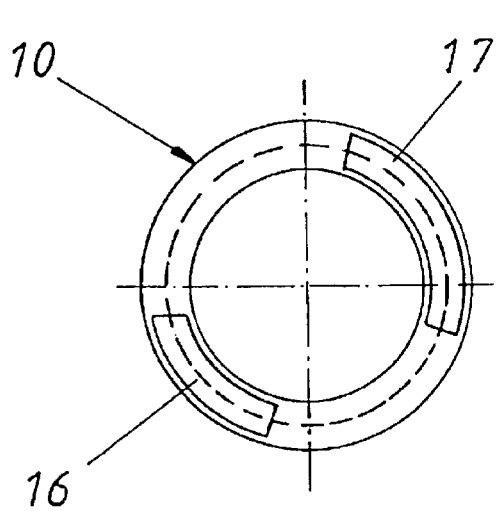
FIG. 3 is a diagram of a top view of the front side of the air distribution plate fixed to the housing.
Figure 5:
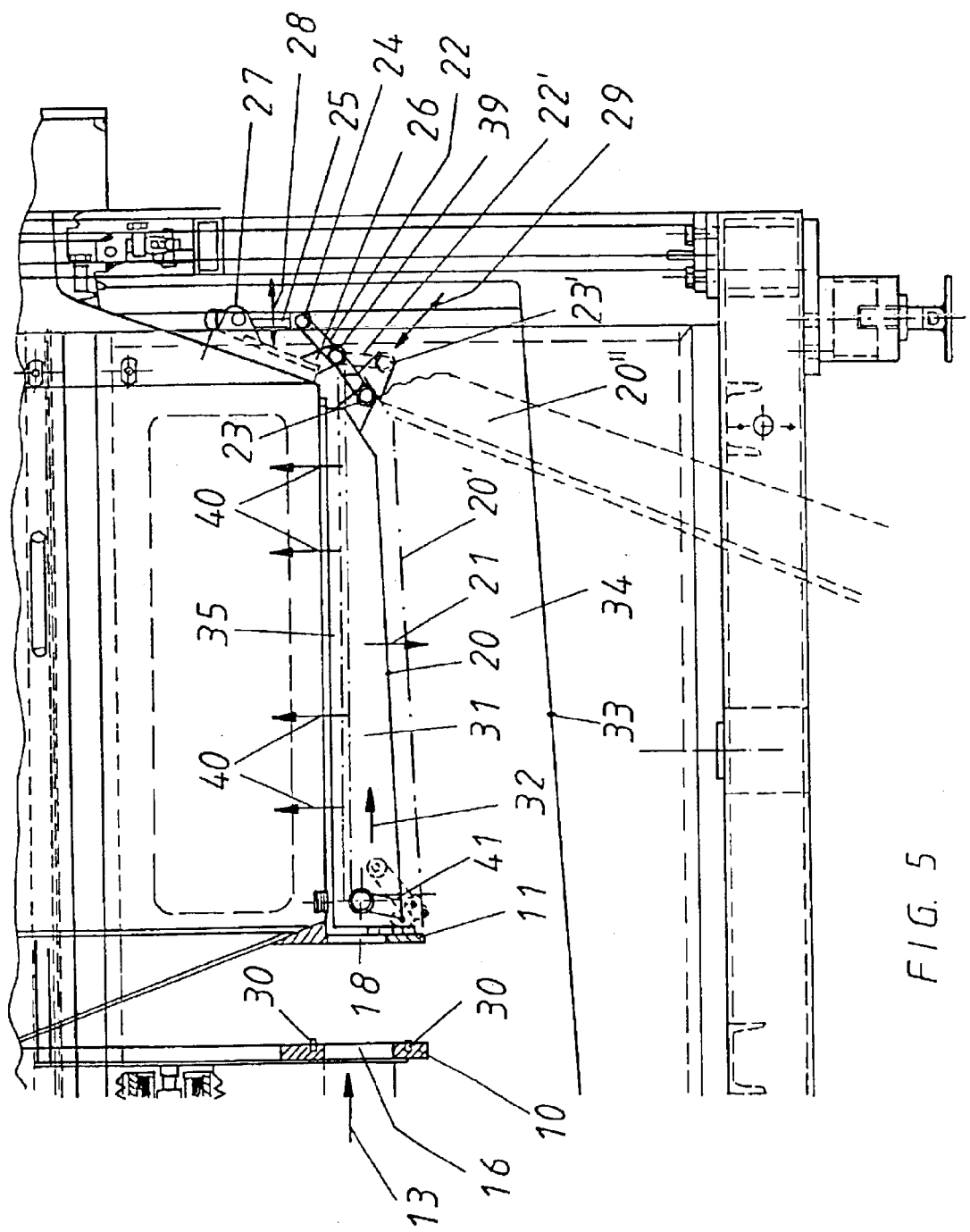
FIG. 5 is an enlarged section of the illustration in FIG. 1 illustrating further details of the displacement mechanism for the air duct covers.
Figure 6:
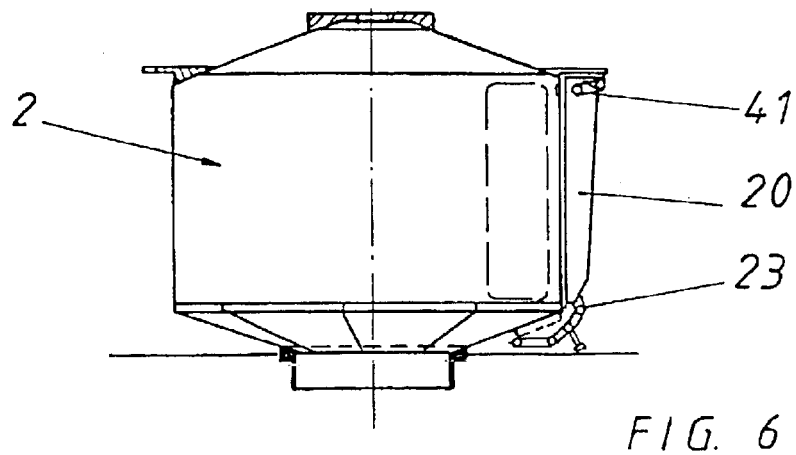
FIG. 6 is a drum with an air duct cover in closed position.
Figure 7:
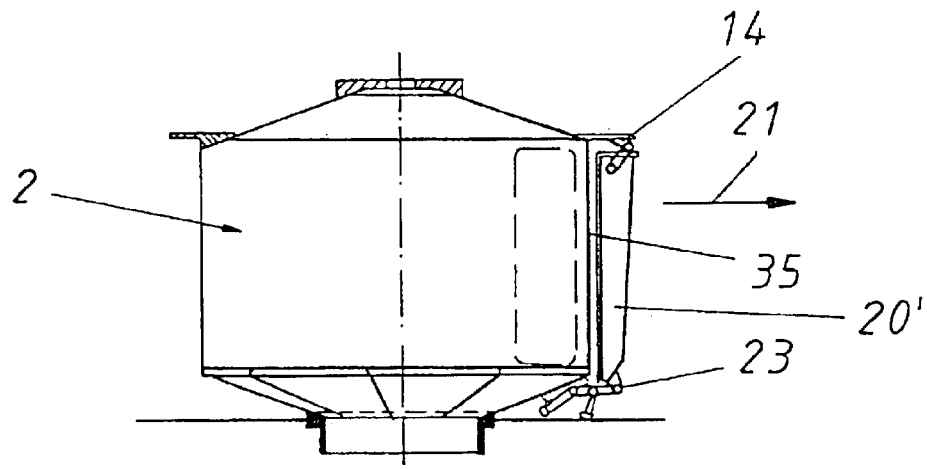
FIG. 7 is the drum of FIG. 6 where the air duct cover is open.

FIG. 1 and FIG. 5 show that the air inlet opening 16, which is ring segment-shaped according to FIG. 3, leads into the bottom part of the air distribution plate 10, while diagonally opposite, the ring segment-shaped air outlet opening 17 is disposed in the air distribution plate 10.

Figure 4:
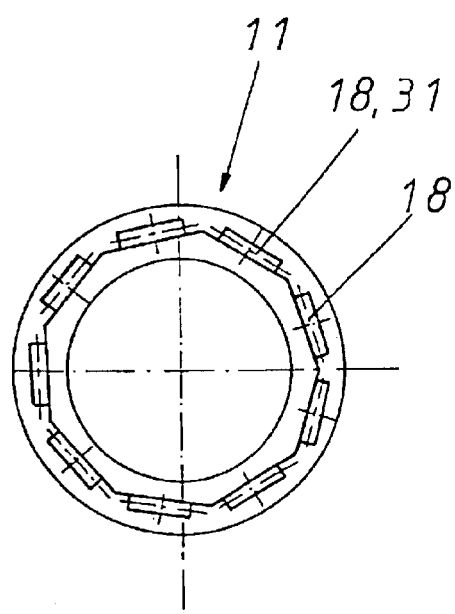
FIG. 4 is a diagram of a top view of the front side of the air distribution plate fixed to the drum.

The front side of the drum 2 has a similar air distribution plate 11 fixed to the drum where on said air distribution plate 11, according to FIG. 4, a total of nine air supply openings 18 are provided evenly distributed over the circumference, for example.

In the cleaning position shown in FIG. 1, the air distribution plate 10 fixed to the housing is moved back from the air distribution plate 11 fixed to the drum so as to be spaced apart as indicated by the double arrow 19.

In operating position, the air distribution plate 10 is moved to the right so that the air inlet openings 16 are opposite and connected so as to seal the air supply openings 18 on the drum.

The seals 30 illustrated in FIG. 5 are provided for reciprocal sealing so as to seal the rotating part against the stationary part.

FIG. 2 also shows that the inlet air flows from the air inlet duct 12 in the direction of the arrow 13 via elastic connections, which are not shown in detail, into the air inlet openings 16 of the air distribution plate 10, while on the other hand, the outgoing air flows from the air outlet opening 17 in the direction of the arrow 15 into the air outlet duct 14 where it is removed from the housing.

Overall, it is also shown that the air distribution plate 10 is a part of two separate sealed housing sections 36, 37. One housing section 36 is used for supplying the inlet air while the other housing section is used for removing the outgoing air. Therefore, the respective inlet and outlet tubes lead into said housing sections 36, 37 and are then guided to the respective ring segment-shaped discharge openings 16, 17.

Irrespective of the air distribution plate 10 moving in axial direction, which can be moved towards and away from the rotating air distribution plate 11, the cleaning of the air ducts in the drum is to be protected in accordance with the other subject matter of the invention.

To this aim, according to one form of the invention, each air supply opening 18 on the drum is provided with an air duct cover 20 located outside in radial direction and configured such that it can be moved towards and away from the air duct 31 integrated in the drum.

Reference is made to FIGS. 5 to 8.

A total of three different functional positions of the air duct covers 20, 20', 20" are shown. In operating position, the air duct cover 20 is placed against the drum so as to seal and therefore taking its operational functional position, which is illustrated in FIG. 5 by means of solid lines.

By means of the articulated lever locking mechanism, which will be described below, the air cover 20 can be brought into its first functional position 20' in the direction of the arrow 21 where it is lifted off approximately parallel from the surface area and vertically with respect to the surface area of the drum, thus forming a cleaning gap 35 through which the cleaning fluid can flow into the interior of the air duct 31. For this purpose, a vat, which can be filled with a cleaning fluid when required, is disposed in the housing underneath the drum. For cleaning, the drum dips into the vat 34 filled with cleaning solution. The bottom 33 of the vat is configured approximately center-symmetrical in profile and the cleaning solution extends approximately to position 38 in FIG. 2.

Now, when the air cover is lifted into position 20', the entire bottom part of the drum with the lifted off air covers 20' dips into the cleaning solution in the vat 34, and the cleaning solution can thus easily and completely enter the air duct 31 in the drum.

Figure 8:
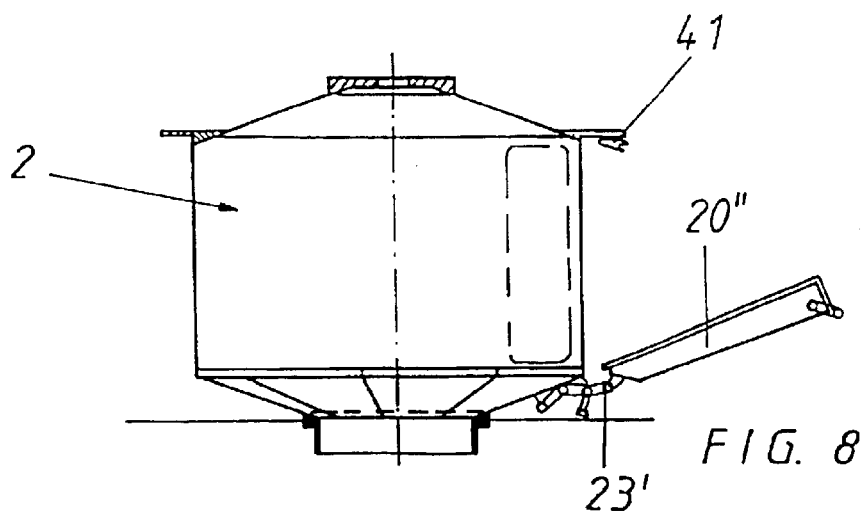
FIG. 8 is the drum of FIG. 6 with the air duct cover swung open.

A second position additionally allows that the entire air cover 20 can also swing out into a position 20" (FIGS. 5 and 8). In this case, the air cover is mounted so as to swing in a hinged bearing 23. The bearing is disposed on the free swinging side of a dual lever 22. Said dual lever is mounted with its center hinged bearing 39 to a bracket 26 fixed to the drum, and the other side of the dual lever 22 is mounted on a hinged bearing 34 which is preloaded by one side of a spring 25 whose other side is put against a spring bearing 27 fixed to the drum.

Therefore, by means of a displacement mechanism, which is not shown in detail, the entire dual lever 22 can swing about the hinged bearing 39 in the directions of the arrow 28 where said driving mechanism can act on the bottom hinged bearing 23 in the direction of the arrow 29, for example.

In this case, it can be a pressure roller fixed to the housing pressing against the hinged bearing in the direction of the arrow 29 so as to swing the air duct cover 20 in the hinged bearing 23, thereby moving the dual lever 22 into a second stable position in the manner which is typical for the kinematics of an articulated lever, where the spring 25 secures the stable second position.

Consequently, said dual lever or articulated lever can also be pushed back into the other position because of the two stable spring positions.

Overall, FIG. 5 also shows that the air supply continues from the air inlet opening 16 in the air distribution plate 10 in the direction of the arrow 32 in the air duct 31 and that the air in the air distribution duct is then evenly distributed in radial direction in the drum in the directions of the arrow 40.

On the side of the outgoing air, the air system works exactly in reverse analog to the description of the air supplied in the air inlet direction. Otherwise, it is understood that the terms used here, such as "air inlet" and "air outlet" can also be reversed because the operation allows that the direction of the air can be reversed under certain operating conditions.

A simpler articulated lever lock is shown on the left side of FIG. 5 for coupling the air duct cover to the drum 2. Said lock can either be fully opened in a first open position so as to allow the air duct cover to swing into position 20", or it can be only partially opened in a second open position so as to allow the air duct cover to be lifted off into position 20'. It is not necessary to provide an articulated lever lock on that side. It can be fully adequate to provide a lock that allows only the first open position, but not the second open position. In this case, it is a simple toggle-type fastener. Said exemplary embodiment will then not produce a cleaning gap with a uniform width over the length, but rather an approximately wedge-shaped cleaning gap extending over the length.

| Drawing References | |
|---|---|
| 1 | Housing |
| 2 | Drum |
| 3 | Driving motor |
| 4 | Belt |
| 5 | Drive pulley |
| 6 | Air pipe |
| 7 | Wall |
| 8 | Thrust cylinder |
| 9 | Sliding bearing |
| 10 | Air distribution plate (housing) |
| 11 | Air distribution plate (drum) |
| 12 | Air inlet duct |
| 13 | Direction of arrow |
| 14 | Air outlet duct |
| 15 | Direction of arrow |
| 16 | Air inlet opening |
| 17 | Air outlet opening |
| 18 | Air supply openings |
| 19 | Double arrow |
| 20 | Air duct cover 20', 20" |
| 21 | Direction of arrow |
| 22 | Dual lever |
| 23 | Hinged bearing 23' |
| 24 | Hinged bearing |
| 25 | Spring |
| 26 | Bracket |
| 27 | Spring bearing |
| 28 | Swing direction |
| 29 | Direction of arrow |
| 30 | Seal |
| 31 | Air duct |
| 32 | Direction of arrow |
| 33 | Bottom of the vat |
| 34 | Vat |
| 35 | Cleaning gap |
| 36 | Housing section (outgoing air) |
| 37 | Housing section (inlet air) |
| 38 | Position |
| 39 | Hinged bearing |
| 40 | Direction of arrow |
| 41 | Articulated lever lock |

What is claimed is:

1. A device for coating granulates and seeds, pellets and dragées with one or more coatings, where the seeds to be coated are placed in a driven rotating drum, into which baffles fixed to the housing and spray and cleaning arms extend, the device comprising:

a drum;

an air supply connected to the drum by means of which the interior of the drum is subjected to an air stream;

air distribution in the drum being achieved by means of an air distribution plate fixed to a front side of the drum associated with an opposite non-rotating air distribution plate fixed to the housing, the non-rotating air distribution plate being configured such that it can move in axial direction towards and away from the drum and which can be connected with the drum by means of air;

the air distribution plate fixed to the drum and the non-rotating distribution plate forming a rotary distributor that is disposed at the rear of the drum;

at least a bottom portion of the drum positioned so that it can be disposed in a vat adapted to be filled with a cleaning fluid.

2. The device as defined in claim 1 including an axial displacement drive for the air distribution plate fixed to the housing comprising a plurality of thrust cylinders, one part of each cylinder engaging a wall fixed to the housing and the other part thereof engaging the non-rotating air distribution plate.

3. A device as defined in claim 2 including air inlet and air outlet openings in the non-rotating air distribution plate each configured as ring segment-shaped and being positioned diametrically opposite each other.

4. A device as defined in claim 3 wherein the air distribution plate fixed to the housing can be connected by means of air to the rotating air distribution plate fixed to the drum by means of a plurality of air supply openings distributed around the circumference of the drum and arranged so as to be covered by overlapping the ring segment-shaped air inlet and air outlet openings.

5. A device as defined in claim 2 wherein the air distribution plate fixed to the housing can be connected by means of air to the rotating air distribution plate fixed to the drum by means of a plurality of air supply openings distributed around the circumference of the drum and arranged so as to be covered by overlapping the ring segment-shaped air inlet and air outlet openings.

6. A device as defined in claim 1 including air inlet and air outlet openings in the non-rotating air distribution plate each configured as ring segment-shaped and being positioned diametrically opposite each other.

7. A device as defined in claim 1 wherein the air distribution plate fixed to the housing can be connected by means of air to the rotating air distribution plate fixed to the drum by means of a plurality of air supply openings distributed around the circumference of the drum and arranged so as to be covered by overlapping the ring segment-shaped air inlet and air outlet openings.

8. A device for coating granulates and seeds, pellets and dragées with one or more coatings, where the seeds to be coated are placed in a driven rotating drum, into which baffles fixed to the housing and spray and cleaning arms extend, the device comprising:

a drum;

an air supply connected to the drum by means of which the interior of the drum is subjected to an air stream;

air distribution in the drum being achieved by means of an air distribution plate fixed to a front side of the drum associated with an opposite non-rotating air distribution plate fixed to the housing, the air distribution plate affixed to the housing configured such that it can move in axial direction towards and away from the drum and which can be connected with the drum by means of air carrying ducts, each air carrying duct in the drum being covered in radial outward direction by an air duct cover;

the air duct cover configured such that it can move in radial direction generally parallel with respect to the surface area of the drum towards and away from the drum so as to form a cleaning gap between the duct cover and the drum.

9. A device as defined in claim 8 wherein each air duct cover on the drum is configured such that it can move or swing towards and away from the drum.

10. A device as defined in claim 9 wherein the air duct covers are mounted to the drum by means of articulated lever locks.

11. A device as defined in claim 8 wherein the air duct covers are mounted to the drum by means of articulated lever locks.

12. A device as defined in claim 8 including air inlet and air outlet openings in the non-rotating air distribution plate each configured as ring segment-shaped and being positioned diametrically opposite each other.

13. The device as defined in 1 including an axial displacement drive for the air distribution plate fixed to the housing comprising a plurality of thrust cylinders, one part of each cylinder engaging a wall fixed to the housing and the other part thereof engaging the non-rotating air distribution plate.

14. A device for coating granulates and seeds, pellets and dragées with one or more coatings, where the seeds to be coated are placed in a driven rotating drum, into which baffles fixed to the housing and spray and cleaning arms extend, the device comprising:

a drum;

an air supply connected to the drum by means of which the interior of the drum is subjected to an air stream;

air distribution in the drum being achieved by means of an air distribution plate fixed to a front side of the drum associated with an opposite non-rotating air distribution plate fixed to the housing, the air distribution plate affixed to the housing configured such that it can move in axial direction towards and away from the drum and which can be connected with the drum by means of air carrying ducts, each air carrying duct in the drum being covered in radial outward direction by an air duct cover;

each air duct cover configured such that it can swing towards and away from the drum so that the air duct cover can fully swing away from the drum and the interior of the drum can be visually inspected.

15. A device as defined in claim 14 wherein each air duct cover on the drum is configured such that it can move or swing towards and away from the drum.

16. A device as defined in claim 15 wherein the air duct covers are mounted to the drum by means of articulated lever locks.

17. A device as defined in claim 14 herein the air duct covers are mounted to the drum by means of articulated lever locks.

18. A device as defined in claim 14 including air inlet and air outlet openings in the non-rotating air distribution plate each configured as ring segment-shaped and being positioned diametrically opposite each other.

19. The device as defined in claim 14 including an axial displacement drive for the air distribution plate fixed to the housing comprising a plurality of thrust cylinders, one part of each cylinder engaging a wall fixed to the housing and the other part thereof engaging the non-rotating air distribution plate.

* * * * *